United States Patent [19]

Ruck et al.

[11] 4,194,816

[45] Mar. 25, 1980

[54] HIGH SPEED ROTATING DRIVE TERMINATION SYSTEM

[75] Inventors: Bernard W. Ruck, Milford; Joseph A. Stella, Peabody; Edward K. Bullock, Marblehead, all of Mass.

[73] Assignee: Polaroid Corporation, Cambridge, Mass.

[21] Appl. No.: 848,815

[22] Filed: Nov. 7, 1977

[51] Int. Cl.$^2$ ............................................. G03C 11/00
[52] U.S. Cl. ................................... 352/130; 352/124; 352/72
[58] Field of Search ............... 352/130, 166, 197, 176, 352/177, 178, 124, 155; 242/199, 200, 205

[56] References Cited

U.S. PATENT DOCUMENTS

| | | | |
|---|---|---|---|
| 3,432,229 | 3/1969 | Freudenschusz | 352/176 |
| 3,809,464 | 5/1974 | Bennett | 352/74 |
| 3,829,204 | 8/1974 | Riedel | 352/124 |
| 3,851,958 | 12/1974 | Land | 352/130 |
| 3,865,331 | 2/1975 | Clever et al. | 242/199 |

*Primary Examiner*—Monroe H. Hayes
*Attorney, Agent, or Firm*—Frederick A. Goettel, Jr.

[57] ABSTRACT

In apparatus for transfering an elongated strip of material wound upon and attached to a first spool from the first spool to a second spool to which the other end of the strip is attached in response to driving torque applied to the second spool, means are provided for terminating the driving torque upon the second spool substantially immediately following passage of all of the elongated strip of material from the first spool to the second spool. In a preferred embodiment means are provided to cooperate with and rotate with the first spool during the transfer of the elongated material to the second spool. Upon complete passage of the strip of material to the second spool, the first spool ceases to rotate and means rotating with the first spool is configured to undergo and axial outward movement at this time as a result of its rotational inertia. This axial outward movement is utilized to trigger a signal causing termination of application of driving torque to the second reel.

17 Claims, 7 Drawing Figures

HIGH SPEED ROTATING DRIVE TERMINATION SYSTEM

BACKGROUND OF THE INVENTION

This invention relates to photographic apparatus and, more particularly, to an improved apparatus for automatically operating a multipurpose film handling cassette through preprogrammed sequences, for both processing and projection.

Cinamatographic systems employing a programmable viewing apparatus and multipurpose cassette containing a film strip together with a supply of processing fluid so that the film strip may be exposed in a camera and subsequently processed and projected in the programmable viewing apparatus are the subject of several issued U.S. patents and pending applications commonly assigned to the assignee of the present invention. For example, U.S. Pat. No. 3,851,958, issued to Edwin H. Land on Dec. 3, 1974, describes a multipurpose cassette, and motion picture system, while U.S. Pat. No. 3,895,862 issued on July 22, 1975 to Joseph A. Stella et al., is directed to a cassette arrangement for the above-noted system.

In the system described in the above-noted patents, a strip of film, as supplied with the cassette, is initially wound on a supply spool and advanced to a takeup spool when the cassette is placed in an appropriate camera for exposure in an essentially conventional fashion. After exposure, the cassette is placed into a viewing apparatus capable of activating a cassette-contained processor to deposit a uniform layer or coating of processing fluid along the length of the film strip as it is rewound from the takeup spool back to the supply spool. Thereafter, the series of successive transparent image frames formed on the film strip may be viewed by projection and rewound for subsequent projection cycles as desired. In the current state of the art, successive convolutions of the film strip wound on the cassette takeup or supply spool are separated by a pair of parallel raised "rails" extending along the longitudinal margins or edges of the film strip. When the processing fluid has been deposited on the emulsion surface of the film strip and the wet film has been wound on the supply spool, the rails serve to space successive convolutions or layers sufficiently so that no mechanical contact is made with the wet emulsion. However, if the film is wound too tightly on the supply spool, successive convolutions of the film may be drawn into contact despite the rails and produce undesirable transfer patterns on the processed positive transparency. Consequently, it is important that the film strip not be wound too tightly on the supply spool during the period following deposition of processing fluid on the film. Further, such "cinching" of the film strip during subsequent rewinds of the processed film strip has also been found to be potentially detrimental to the quality of the processed positive transparency and accordingly is considered undesirable.

U.S. Pat. No. 3,851,958, entitled "PHOTOGRAPHIC SYSTEM FOR PROCESSING AND PROJECTING TRANSPARENCIES" cited hereinabove, describes a system for sensing the termination of film strip travel at the end of rewind and for shutting off the drive motor and ejecting the cassette from the viewing apparatus. In such a system, use is made of an existing "jam sensor" circuit which is designed to sense termination of rotation of the takeup reel drive shaft in the viewer and upon cessation of such rotation for a predetermined time will cause a signal to occur which initiates motor shut off and ejection of the cassette from the viewer. In order to avoid accidental generation of this signal, the time constant selected is relatively long, i.e., it has typically been on the order of three seconds. Accordingly, since this same system has been used for ejection of the cassette at the termination of rewind, the film strip has been potentially subjected to three seconds of "cinching" at the end of rewind following each projection cycle.

SUMMARY OF THE INVENTION

In accordance with the present invention, the problems associated with tightening or cinching of the film strip on the supply spool following high speed rewind are substantially eliminated by providing the programmable viewing apparatus designed to process, project and rewind the cassette-contained film, with means actuated by the termination of rotation of the film strip takeup reel to initiate a signal which results in rapid shut-off of the electric motor drive system thereby terminating application of driving torque to the supply reel. Ejection of the cassette from the viewing apparatus is also caused to occur in response to the signal. Specifically, use is made of axial motion of the film strip takeup reel drive shaft which occurs immediately following passage of all of the film strip from the takeup reel back onto the supply reel during rewind to close a switch which in turn causes a signal to occur which in turn causes a change of mode of the processor from the rewind to the off/eject mode with a minimum of delay.

As described above, the film cassette for use with the present invention includes a pair of rotatable film reels for storing and taking up a supply of film. Drive interface means are provided on each reel and positioned to be accessible from the exterior of the cassette. Each interface comprises an abutment means extending axially from the associated reel and defining a drive shoulder and a camming shoulder. The drive and camming shoulders are arranged to converge in a direction axial to the reel to thereby eliminate any surfaces which would interfere with the positive engagement of the drive interface with the external drive system of the viewer. The external drive system of the viewer is provided with a similarly configured cassette engaging structure defining a driving shoulder and a camming shoulder, the driving shoulder being adapted to positively engage the drive shoulder in the associated cassette and to thereby positively drive the associated reel when the drive shaft is driven by the viewer's motor drive system. During rewind of the cassette, the supply reel is positively driven by its associated drive shaft to thereby cause the film to be wound upon the supply reel. During this time, the takeup reel is rotating and is causing the takeup reel drive shaft, which is engaged with the takeup reel drive interface means, to also rotate freely because it is not at this time positively connected to the viewer drive system. Upon passage of all of the film strip from the takeup reel to the supply reel, the motion of both of the reels terminates rapidly. At this time, the inertia of the freely rotating takeup drive shaft will cause the shaft to continue rotating and thereby cause the camming surfaces of the takeup reel drive interface and the takeup drive shaft camming surface to come into contact resulting in a force which imparts axial motion of the takeup reel drive shaft away from the drive interface of the takeup reel. This axial motion of the takeup reel drive shaft which occurs immediately following termination of rotation following rewind is utilized to close a switch resulting in a mode change of the programmable viewer to the off/eject position whereby the drive sytem is inactivated and the cassette is caused to be ejected from the viewer.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein:

DESCRIPTION OF THE PREFERRED EMBODIMENT

Figure 1:
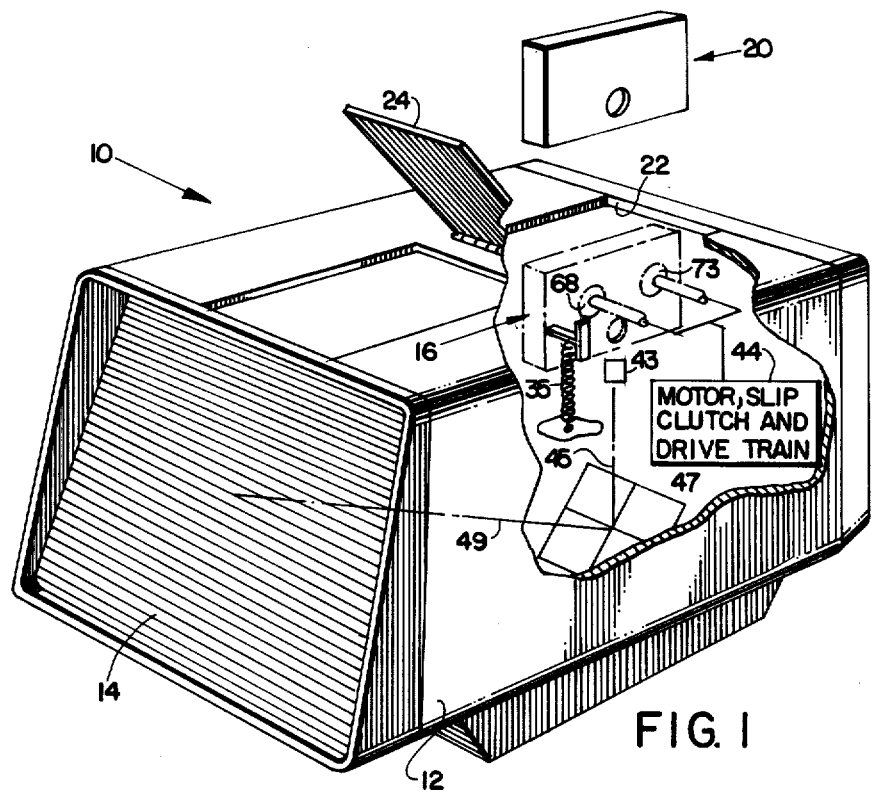
FIG. 1 is a diagrammatic perspective view of a motion picture film handling cassette and a motion picture viewer apparatus embodying the features of this invention.
Figure 2:
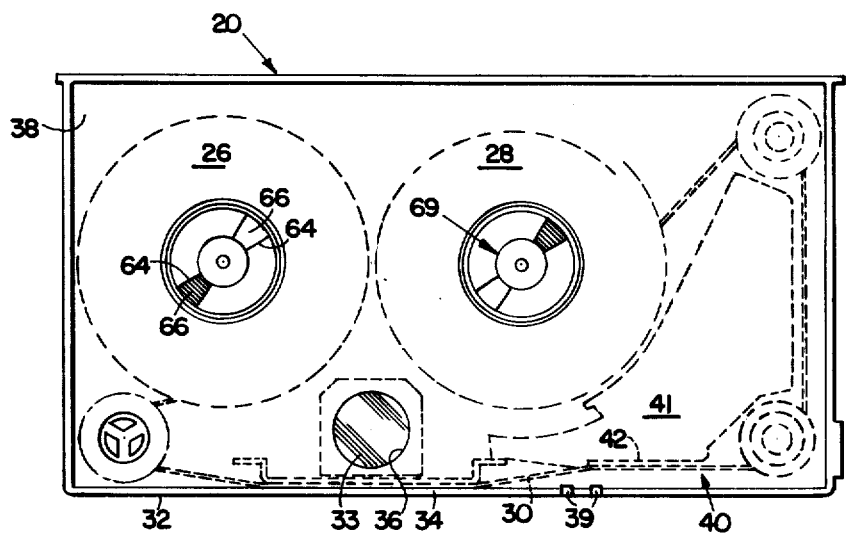
FIG. 2 is a diagrammatic view in elevation of a compact multipurpose film handling cassette embodying features of this invention.

As shown in FIG. 1, the photographic apparatus of the present invention preferably takes the form of a rear projection viewer 10 comprising a box-like housing 12 defined in part by a front viewing screen 14. Positioned rearwardly of screen 14 and in adjoining relation to the top surface 16 of the housing 12 is a cassette receiving well 18 which is adapted to hold a motion picture film cassette 20 as shown in FIG. 2. The cassette receiving well 18 extends to and is in communication with an opening 22 in the top surface 16 of the housing 12. Pivotally mounted at the forward edge of opening 22 is a door member 24 for controlling access to the cassette well 18. Hence, the door 24 is mounted for pivotal motion between a closed position, blocking the opening 22, and an open position permitting insertion and removal of the cassette 20.

The cassette 20 is a multipurpose motion picture film cassette and may, for example, take the form of the cassette described in U.S. Pat. No. 3,608,455 of Rogers B. Downey, which is designed for exposure, processing and projection without removal of its film from the cassette casing. Preferably, the cassette comprises a generally flat parallelepiped casing enclosing a pair of motion picture film spools 26 and 28 to which a motion picture film strip 30 is attached so as to be disposed for transport between one spool and the other in an arrangement wherein portions of the film are advanced across a film gate or opening 34 which facilitates projection of the film images in a manner to be subsequently described.

Means are also provided in the cassette 20 to permit entrance of suitable illumination and for redirecting such illumination in a downward direction to the film 30 and out of the opening 34. For example, in the illustrated embodiment, an opening 36 is provided in one side wall 38 which adjoins the lower edge 32 of the cassette 20, and a reflector element 33 such as a mirror or reflecting prism is included within the cassette to redirect the light entering opening 36, out of the projection station opening 34. Hence, an illumination means (not shown), for example, a conventional projection lamp is mounted in the apparatus in an adjoining relation to the opening 36 so as to suitably direct illumination into the cassette 20. It will therefore be appreciated that the cassette opening 34 serves in part to define an exposure station during a first transport of the film strip 30 thereacross and a projection station during subsequent passes of the film strip thereacross. Carried within cassette 20 is a processing station 40, such as described in the aforementioned U.S. Pat. No. 3,608,455, which includes a processor 41, designed for selective operation for distribution of an appropriate processing fluid (not shown) over the film 30 during transport of the latter past dispensing surface or processor nozzle 42, located near the bottom 44 of the processor. In the preferred embodiment, the processor 41 is perpendicular to the plane of the projection station opening 34, and is intended for operation in an upright attitude which facilitates gravitational flow of its fluid to the lower dispensing nozzle 42. Consequently, the well 18 is adapted to locate the cassette 20 in the vertical plane with its projection edge 32 parallel to the horizontal axis of the viewer 10 and hence, in a horizontal plane.

Mounted within the housing 12 in adjoining relation to the cassette receiving well 18 are drive means 44, comprising a suitable motor and drive train, for selectively driving spools 26 and 28 for advancing the film strip 30 from one of the spools 26, 28 to the other of the spools 26, 28, the direction of advancement depending upon the mode of operation of the viewer. The direction of advancement of the film strip, for example, depends upon whether the viewer is projecting a film strip, rewinding, or processing a cassette inserted in the viewer for the first time. In addition, a conventional claw arrangement (not shown) is adapted to engage the film strip 30 in a conventional manner in the vicinity of the cassette opening 34 so as to progressively advance incremental sections of the film thereacross during the projection mode of operation.

Mounted beneath the cassette receiving well 18 in alignment with the opening 34 is a lens assembly 43 adapted to project an image of the film presented at the opening 34 and focus it in a given plane at a given distance from the film 30. The lens assembly 43 directs an image vertically downward along an optical axis designated as 45 to a reflective means such as a mirror 47, mounted in the path of the optical path 45 and at an angle thereto so as to redirect the projected image forwardly along an upwardly inclined axis 49 to the rear of the screen 14.

As implied hereinabove, the viewer 10 is capable of operating in several different modes, depending upon the condition of the cassette placed into the viewer. The specific details of such a viewer and apparatus for carrying out such modes of operation are set forth in extensive detail in the above-cited U.S. Pat. No. 3,851,958 and will not be delved into in great detail in the present description. A brief description of the modes of operation of which such a viewer are capable of performing will, however, be set forth in order to appreciate and fully understand the operative embodiment of the present invention to be hereinafter described in detail.

Figure 7:
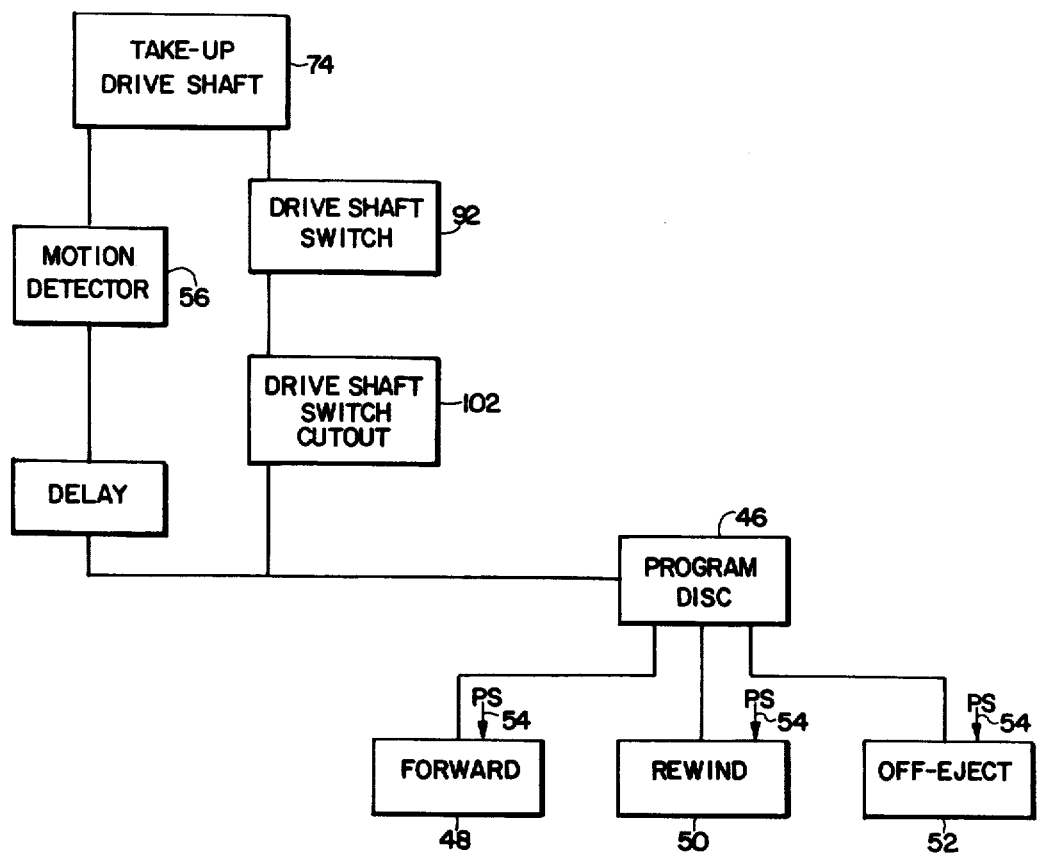
FIG. 7 is a simplified block diagram showing the interrelationship between the elements of the present invention and the basic control elements of the viewer system.

Referring now to FIG. 7, a simplified block diagram is shown which schematically illustrates the operation of the apparatus of the present invention in relation to the basic control system and arrangement of the viewer as described in U.S. Pat. No. 3,851,958. The mode of operation of the viewer is controlled by the position of a rotatable program disc identified diagrammatically by reference numeral 46. The program disc has three basic positions, FORWARD, REWIND and OFF-EJECT, respectively identified by reference numerals 48, 50 and 52.

A pair of contacts 39 on each cassette 20 produce a signal or condition in the viewer that indicates whether or not the film within the cassette has been processed. This signal is sensed by the film drive and projection system when the cassette is inserted into it. If the film has been processed, the program disc 46 of the viewing apparatus 10 will switch into its FORWARD or projection mode to thereby project the entire film strip for viewing on the screen 14. Following projection, advancement of the program disc 46 to its REWIND position results in rapid rewinding of the projected film back onto the supply reel 28, and following that, advancement of the program disc to its OFF-EJECT position results in automatic ejection of the cassette from the viewer and shut off of the viewer apparatus. Ejection is effected by suitable apparatus such as, for example, an ejection spring 35 acting upon the cassette to urge it out of the slot 18.

If the film strip 30 within the cassette 20 has not been processed, the signal from the cassette contacts 39 is again sensed by the film drive and projection system when the cassette is inserted therein and a so-called process signal identified as PS (reference numeral 54) is applied to the control system of the viewer to thereby modify each of the operating modes 48, 50 and 52 to operate upon the cassette 20 in a manner to cause the internally programmed processor 40 carried within the cassette, responsive to manipulation of the film in the cassette by appropriate movement of the supply and takeup spools, to apply the processing composition to the exposed film within the cassette.

Accordingly, when an unprocessed cassette is placed in the viewer 10, the program disc 46 will automatically move to the REWIND mode 50 and a rewind cycle modified in some respects by the process signal will cause the exposed film strip to pass from the takeup spool 26 to the supply spool 28 at which time the processing fluid will be deposited upon the film strip by the processor 40. Following deposition of the the processing fluid, a short interval of time is allowed to elapse during which the film is motionless, permitting complete processing of the film strip to occur. Following this short time interval, the program disc 46 is caused to move to its projection or FORWARD mode 48, thereby projecting the film strip. Following this initial projection operation, the cassette 20 is automatically ejected from the viewer in a conventional fashion as described hereinabove.

The film drive means 44 includes a drive mechanism coupled to the supply and takeup reels through a slip clutch arrangement (not shown). When the end of the film 30 is reached on the takeup reel during rewind, the clutch slips, and the cessation of motion of the takeup reel 26 is sensed by a motion sensor 56 which, after a predetermined time generates a signal which causes the program disc to advance to the OFF-EJECT mode of operation 52. During the time period between when all of the film strip 30 has passed from the takeup reel 26 to the supply reel 28, and accordingly the takeup reel has ceased to rotate, and the time when the motion detector 56 has signalled to move the program disc 46 to the OFF-EJECT mode, the drive means 44, through its drive mechanism and slip clutches, continues to impart a driving torque to the supply reel 28. Such application of torque to the supply reel 28 during this time results in a continued rotation of the supply reel for a period of time during this time interval. This continued rotation of the supply reel 28 following substantially complete removal of all of the film strip from the takeup reel 26 results in a tightening of the film strip convolutions wrapped around the supply reel nearest the center of the reel. This continued rotation and the resulting relative motion of the convolutions of the film strip with respect to one another may result in extremely undesirable delamination of portions of the image-receiving layer of the film from the base portion thereof. The present invention will now be described with relation to the basic system described hereinabove. The invention, it will be seen, is directed towards terminating the driving torque upon the supply reel following the rewind operation as quickly as possible following complete passage of the film strip 30 from the takeup reel 26 to the supply reel 28.

Figure 3:
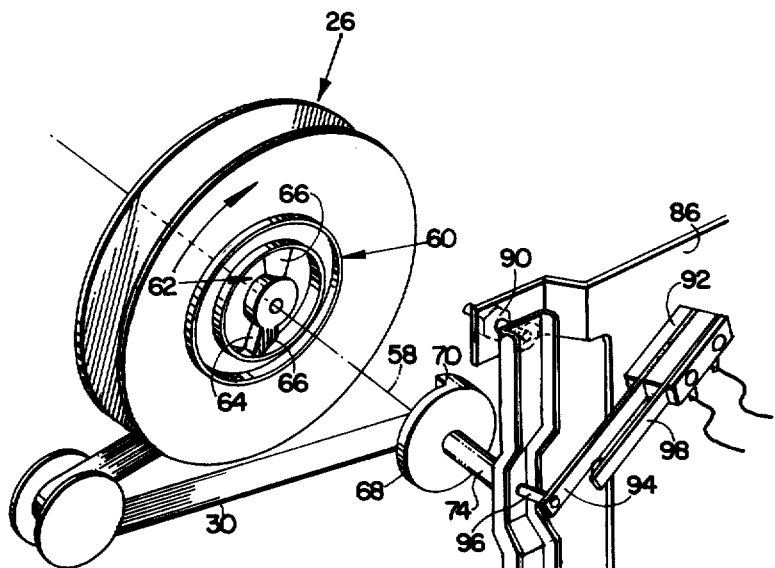
FIG. 3 is a greatly simplified diagrammatic perspective view showing the essential parts of a cassette as shown in FIG. 2 and viewer structure necessary to illustrate the principles of the present invention.

FIG. 3 illustrates only the essential elements of a viewer generally designated as 10 and its intended cooperation with a cassette 20 in a manner according to the present invention. A multipurpose film cassette takeup spool 26 is illustrated which is intended to be mounted for rotation about the axis 58. A hub 60 is provided on the central portion of the takeup spool 26 concentric with the rotational axis 58. The film strip 30 has one end fixedly attached to the hub of the takeup spool 26 and the other end thereof similarly fixedly attached to the supply spool 28, as described in connection with FIG. 2.

Figure 4:
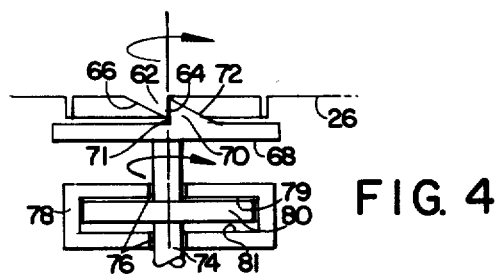
FIG. 4 is a greatly simplified cross-sectional view showing the interface between the takeup reel hub and its associated driving head and illustrating the condition at that interface during high speed rewind.
Figure 5:
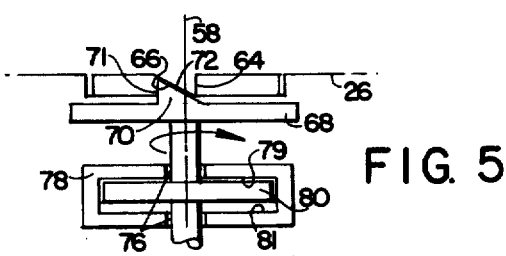
FIG. 5 is a view similar to FIG. 4 showing the condition at the takeup reel drive interface immediately following termination of high speed rewind.
Figure 6:
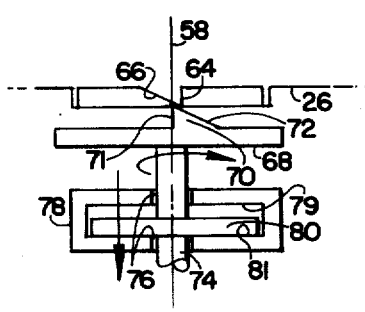
FIG. 6 is a view similar to FIG. 4 showing the condition at the takeup reel drive interface showing the axial motion of the takeup reel drive shaft which causes the OFF-EJECT signal to occur.

The hub 60 of the takeup spool 26 is provided with a drive interface which permits the reel to be positively engaged and driven in a selected direction by the drive system 44 of the viewer 10. As best seen in FIG. 3 and with further reference to FIGS. 4, 5 and 6, the drive interface comprises an abutment member 62 positioned on the hub 60. In the illustrated embodiment, the hub 60 includes a pair of diametrically opposed abutment members 62 which extend generally radially from the hub 60. The abutment members 62 define driving shoulders 64 which are designed to cooperate with elements of the external drive system 44 which moves generally axially of the spool 28 into engagement with the abutment members 62. As seen in FIGS. 4, 5 and 6, the drive shoulders 64 are formed on a plane surface that extends in a generally axial direction with respect to the takeup spool 26. The drive shoulders 64 may thereby be engaged by the external driving system 44 in driving engagement as will be further described hereinbelow.

As seen clearly in FIGS. 4, 5 and 6, the abutment members 62 further define inclined camming shoulders 66. The camming shoulders 66 are inclined at a selected angle with respect to the axis 58 of the takeup reel 26 and with respect to their associated driving shoulders 62. While illustrated in essentially back-to-back relationship, the surfaces of the driving face 62 and the inclined surface 66 may be further circumferentially spaced from one another about the axis 58 of the hub 60.

The external driving system 44 is provided with a driving head 68 adapted for engagement with the driving shoulders 64 provided on the takeup reel hub 60. The driving head 68 also includes projecting drive abutments 70 which are comparable with the abutments 62 provided on the takeup reel hub 60. The abutments 70 include drive shoulders 71 which mate with the drive shoulder 64 on the takeup reel hub 60. The abutments 70 also define inclined camming shoulders 72 which are designed to engage with and slide along the camming shoulders 66 provided on the takeup reel hub 70.

The supply reel 28 comprises a hub drive interface 69, shown in FIG. 2, substantially identical to that of the takeup reel 26 and similarly, is provided with a supply reel driving head 73 shown in FIG. 1. The supply reel hub 69 and driving head 73 are adapted to drive the supply reel in a clockwise direction, whereas the drive arrangement for the takeup reel 26, described above, is adapted to drive that reel in a counterclockwise direction.

Referring to FIGS. 4, 5 and 6, the takeup reel drive head 68 is mounted on a drive shaft 74 which is slidably mounted in suitable bushings 76 provided in the viewer structure 78 as illustrated schematically in FIGS. 4, 5 and 6 in a manner which permits the head 68 to move in and out within limits established by engagement of a collar 80 carried by the shaft 74 with abutments 79, 81 from a first position adjacent abutment 79 to a second position adjacent abutment 81. A leaf spring member 82 is suitably attached at one end 84 to the viewer structure 86 and the other end thereof engages the outer end 88 of the takeup reel drive shaft 74 to bias the shaft towards the cassette 10. An adjustable set screw 70 engaging with the upper end of the spring, limits the inward biasing force of the spring 82. The screw 90 preferably is adjusted to establish the inward location for the drive head 68 in the driving position with respect to the cassette. The screws also prevent axial loading on the shaft 74 and the other components of the drive system which would create friction drag in the drive system.

A reed switch 92 is mounted to the viewer structure 86 in a position offset from the takeup reel axis 58 and has a first cantilevered element 94 extending to a position rearward of the upper end of the leaf spring 82. An actuating element 96 is carried at the outer end of the first element 94 which extends into engagement with the backside of the leaf spring member 82. The second contact 98 of the reed switch 92 extends substantially parallel to the first element 94 and is in a position such that a rearward displacement of the upper end of the leaf spring member 82 will act through the actuating element 96 to deflect the first member 94 of the reed switch 92 into electrical contact with the second element 98, thereby completing an electrical circuit which is adapted to cause the drive mans to be actuated to rotate the program disc 46 to effect a change of mode of operation. How such movement of the takeup reel drive shaft 74 occurs to effect such switch actuation will now be described in detail.

As was described hereinabove, the supply reel drive head 73 is adapted to drive the supply reel 28 through cooperation with the supply reel drive interface 69 in a clockwise direction during the high speed rewind mode of operation, thereby causing the portion of the film strip 30 carried by the takeup reel 26 to pass from the takeup reel to the supply reel. During such rewind mode of operation, the takeup reel drive head 68 which at this time is not drivingly connected to the drive means 44, remains in contact with the takeup reel hub 60 as a result of the biasing force of the leaf spring member 82. Accordingly, during the rewind operation, the takeup reel 26 is also being caused to rotate in a clockwise direction as a result of the convolutions of the film strip 30 being withdrawn therefrom. As a result of such driving of the takeup reel 26 by the film strip 30, the takeup reel, through the drive shoulders 64 of its respective abutment members 62, in turn causes the takeup reel drive head 68 and its associated drive shaft 74 to also rotate in a clockwise direction during high speed rewind.

Referring now to FIGS. 4, 5 and 6, during high speed rewind, the takeup reel drive head 68 and its associated drive shaft 74 have imparted thereto a certain amount of rotational inertia as a result of being driven by the takeup reel 26. FIG. 4 illustrates the relative motions of the takeup reel drive head 68 and the takeup reel hub 60 during high speed rewind. Following the complete passage of substantially all of the film strip 30 from the takeup reel 26 to the supply reel 28, the takeup reel causes to rotate. At this instant, the takeup reel drive drive head 68 and shaft 74 assembly continues to rotate as set forth above, unrestrained by the drive means 44. Such rotation causes the takeup reel driving head shoulders 71 to rotate out of engagement with its mating surface 64 on the takeup reel hub 60 and results in rotation of the camming shoulders 72 of the drive head abutment 70 into engagement with the mating camming surfaces 66 of the takeup reel hub 60. Such a condition is illustrated in FIG. 5.

The rotational inertia of the takeup reel drive shaft and head assembly is sufficient to cause the camming surfaces 66, 72 to ride upon one another thereby camming the takeup reel drive interface 68 and drive shaft 74 outwardly displacing the takeup reel shaft from its first position adjacent abutment 79 to its second position adjacent abutment 81. The axial motion experienced by the takeup reel drive shaft 74 is sufficient to deflect the outer end of the leaf spring member 82 thereby deflecting the first element 94 of the reed switch 92 into electrical contact with the second element 98 thereof, thereby effecting completion of the electrical circuit to cause the desired change of mode of operation which in the case being described results in rotation of the program disc 46 from the REWIND mode 50 to the OFF-EJECT mode 52, thereby substantially immediately cutting off electrical power to the drive motor of the drive means 44 and thereby terminating the driving forces to the supply reel 28 upon which substantially all the film strip 30 had been coiled by the rewind operation.

This substantially instantaneous termination of the driving torque forces results in a substantial reduction of the continued rotation of the supply reel 26 following passage of all of the film strip 30 into it during high speed rewind, thereby substantially reducing the undesirable effects of the cinching or tightening of the film strip 30 which otherwise would occur were the driving forces to continue upon the supply spool 28 following rewind for the period necessary for the jam sensor arrangement of the prior art to cause the change of mode to the OFF-EJECT mode.

Referring to FIG. 7, it will be seen that the reed switch 92 identified therein as the drive shaft switch is provided with a drive shaft switch cutout 102. This cutout is preferably an electronic arrangement whereby the drive switch 92 is rendered inoperable during certain modes of operation of the viewer apparatus 10. Such a cutout is provided as it is possible for the above-described switch actuation to occur during other modes of operation of the viewer not described in detail herein, for example, during actuation of the viewer 10 for an instant replay during viewing of the film strip. Accordingly, the drive shaft reed switch 92 is energized or powered only during the REWIND mode thereby precluding a false signal from the switch 92 which would initiate an undesirable change of mode to the OFF-EJECT mode of operation.

In actual tests using high speed movies which permit slow motion viewing of the relative motion of the film strip 30 and the outer perimeter of the supply spool 28, it was observed that between 780 degrees and 1,100 degrees of cinching or continued rotation of the supply spool occured following complete passage of the film strip from the takeup spool to the supply spool during high speed rewind. The cinching conditions described above occurred using a viewer apparatus employing the prior art jam sensor arrangement to signal a change of mode to the OFF-EJECT mode of operation. Such jam sensor arrangement has typically been designed to cause the mode change to OFF-EJECT following cessation of rotation after a delay period of approximately three seconds. The high speed movies revealed that the continued rotation of the supply spool 26 causing cinching continued for approximately 500 milliseconds of the three second delay time. Such a condition exists, as the slip clutch in the drive system would begin to slip following the tightening of the film strip on the supply reel and accordingly, during the remaining two and one-half seconds of the delay period, the supply spool would be subjected to a constant driving torque equal to the designed slipping torque of the clutch of the drive system.

By contrast, high speed movies taken of a viewer using the system of the present invention, with all other factors constant, resulted in a change of mode and ejection of the cassette from the viewer in approximately 110 to 115 milliseconds. During this time, the supply reel rotated consistantly approximately 270 degrees before termination of driving torque to the supply spool 28. Accordingly, it is seen that the present invention is capable of reducing the rotation of the supply spool following rewind to less than one revolution of the supply reel drive shaft or spool 74.

Comparison of film strips from large samples of cassettes using the prior art system and the system of the present invention disclosed a dramatic decrease in the undesirable delaminations of the image bearing layer, described hereinabove. Accordingly, it should be appreciated that the system of the present invention represents a significant improvement in systems for terminating the application of driving torque to a system of the type for handling elongated strips of materials which are transferred from a pair of rotatably mounted spools, in order to eliminate undesired stresses upon the material.

While the invention has been described with particularity with respect to the details of a specific embodiment thereof, the invention is applicable to other types of apparatus using drive systems for elongated strips of material. It should be understood that this invention may be practiced or embodied in other ways without departing from the spirit or essential character thereof. Hence, the preferred embodiment described herein is illustrative and not restrictive, the scope of the invention being indicated by the appended claims and all variations which come within the meaning of the claims are intended to be embraced therein.

What is claimed is:

1. Apparatus comprising:
   a cassette including:
      a first rotatably mounted spool;
      a second rotatably mounted spool, said second spool including means for engaging a shaft, said engaging means including a first abutment surface extending outwardly of one side of said second spool and a second abutment surface extending outwardly from said one side of said second spool and canted at an angle with respect to its axis of rotation so as to face said second spool's first abutment surface in spaced relationship around its said axis of rotation with respect thereto;
   means for depositing a coating of fluid on said elongated strip of material during at least its first advancement from said second spool to said first spool; and
   an elongated strip of material having its opposite ends respectively connected to the first and second spools with a major portion thereof coiled around one of said spools; and
   a cassette operating device including:
      means for receiving and mounting the cassette;
      a rotatably mounted drive assembly engageable with said first spool;
      a rotatably mounted shaft engageable with said second spool, said shaft including a first abutment surface extending outwardly thereof in a manner so as to be engageable with said first abutment surface of said second spool and caused to be rotated in a first direction when said drive assembly is actuated to effect the advancement of portions of said strip of material coiled around said second spool onto and around said first spool, said first abutment surface of said second spool and said first abutment surface of said shaft being configured so that the former does not exert force on the latter at such times tending to urge said shaft axially away from said second spool, and a second abutment surface extending outwardly from said shaft at an angle canted with respect to its axis of rotation so as to face said shaft's first abutment surface in radially spaced relationship around its said axis of rotation with respect thereto, said second abutment surface of said second spool thus serving to exert forces against said second abutment surface of said shaft tending to displace said shaft away from said second spool in a direction axially thereof when substantially all of said strip of material has been uncoiled from said second spool causing the termination of rotation of said second spool and inertial forces in said shaft continue to effect rotational movement of said shaft in said first direction displacing its said second abutment surface into engagement with said second abutment surface of said second spool;

means for mounting said shaft for axial displacement between a first position wherein said first abutment surface thereof and said first abutment surface of said second spool are operably disposed for purposes of effecting driving engagement therebetween and a second position wherein said shaft is axially disposed a further distance away from the other side of said second spool, and for yieldably restraining said shaft in its said first position, the forces acting between said second abutment surfaces of said second spool and said shaft when said second spool has ceased rotating and the inertia of said shaft causes said shaft to continue to rotate in said first direction being effective to displace said shaft from its said first position towards its said second position;

motor means energizable by a source of electrical energy for selectively imparting torque forces on said drive assembly to effect the rotation thereof about its axis of rotation in a direction advancing portions of said strip of material coiled around said second spool onto and around said first spool thereby imparting a rotation of said second spool about its said axis of rotation in said first direction thereby effecting deposition of said fluid upon said elongated strip; and means responsive to the displacement of said shaft from its said first position into its said second position for terminating said torque forces thereby minimizing any tensioning forces on the elongated strip after such advancement has been completed, thereby also minimizing contact between adjacent convolutions of the strip wound upon said first spool following the deposition of the fluid thereon.

2. The apparatus of claim 1 wherein said first abutment surface of said second spool extends outwardly of said one side of said second spool in a direction substantially parallel to, and generally radially from, its said axis of rotation and said first abutment surface of said shaft extends outwardly thereof in a direction substantially parallel, and generally radially from, its said axis of rotation.

3. The apparatus of claim 1 wherein said drive assembly includes a slip clutch.

4. Apparatus for use with a first spool, a second spool having a first abutment surface extending outwardly of one side thereof and a second abutment surface extending outwardly from the one side thereof and canted at an angle with respect to its axis of rotation so as to face its first abutment surface in spaced relationship around its axis of rotation with respect thereto, and an elongated strip of material having its opposite ends respectively connected to the first and second spools with a major portion thereof coiled around one of the spools, said apparatus comprising:

a rotatably mounted drive assembly for engaging the first spool;

a rotatably mounted shaft for engaging said second spool, said shaft including a first abutment surface extending outwardly thereof in a manner so as to be engageable with the first abutment surface of the second spool and caused to be rotated in a first direction when said drive assembly is actuated to effect the advancement of portions of the strip of material coiled around the second spool onto and around the first spool, said first abutment surface of the second spool and said first abutment surface of said shaft being configured so that one does not exert force on the other at such times tending to urge said shaft and the second spool axially away from each other, and a second abutment surface extending outwardly from said shaft at an angle canted with respect to its axis of rotation so as to face said shaft's first abutment surface in spaced relationship around its said axis of rotation with respect thereto, the second abutment surface of the second spool thus serving to exert forces against said second abutment surface of said shaft tending to displace the second spool and said shaft away from each other in a direction axially thereof when substantially all of the strip of material has been uncoiled from the second spool causing the termination of rotation of the second spool and inertial forces in said shaft continue to effect rotational movement of said shaft in said first direction displacing its said second abutment surface into engagement with the second abutment surface of the second spool;

motor means energizable by a source of electrical energy for selectively imparting torque forces on said drive assembly to effect the rotation thereof about its axis of rotation in a direction advancing portions of the strip of material coiled around the second spool onto and around the first spool thereby imparting a rotation of the second spool about its axis of rotation in the first direction;

means for depositing a coating of fluid on said elongated strip of material during at least its first advancement from said second spool to said first spool;

means for determining when forces exist between the second abutment surface of the second spool and said second abutment surface of said shaft tending to displace the second spool and said shaft away from each other in a direction axially thereof; and means responsive to said determining means for terminating said torque forces thereby minimizing any tensioning forces on the elongated strip after such advancement has been completed, thereby also minimizing contact between adjacent convolutions of the strip wound upon said first spool following the deposition of the fluid thereon.

5. The apparatus of claim 4 additionally including means for restraining movement of the second spool axially away from said shaft responsive to forces existing between the second abutment surface of the second spool and said second abutment surface of said shaft tending to displace the second spool and said shaft away from each other in the direction axially thereof, means for mounting said shaft for axial displacement between a first position wherein its first abutment surface is drivingly engaged by the first abutment surface of the second spool and a second position wherein said shaft is spaced a distance further away from the other side of the second spool, a normally conductive electrical switch electrically coupled between the source of electrical energy and said motor means and operably associated with said shaft so as to be rendered non-conductive whenever said shaft is displaced from its said first position towards its said second position.

6. The apparatus of claim 4 wherein said first abutment surface of said shaft extends outwardly thereof in a direction substantially parallel, and generally radially from, its said axis of rotation.

7. The apparatus of claim 4 wherein said drive assembly includes a slip clutch.

8. Apparatus for use with a cassette having a first spool, a second spool having a first abutment surface extending outwardly of one side thereof and a second abutment surface extending outwardly from the one side thereof and canted at an angle with respect to its axis of rotation so as to face its first abutment surface in spaced relationship around its axis of rotation with respect thereto, an elongated strip of photographic material having its opposite ends respectively connected to the first and second spools with substantially the entire length thereof coiled around its second spool in an exposed unprocessed condition, and means selectively operable for applying a coating of processing fluid along the strip of photographic material as it is advanced from the second spool toward the first spool, said apparatus comprising:

a rotatably mounted drive assembly for engaging the first spool;

a rotatably mounted shaft for engaging said second spool, said shaft including a first abutment surface extending outwardly thereof in a manner so as to be engageable with the first abutment surface of the second spool and caused to be rotated in a first direction when said drive assembly is actuated to effect the advancement of portions of the strip of material coiled around the second spool onto and around the first spool, said first abutment surface of the second spool and said first abutment surface of said shaft being configured so that one does not exert force on the other at such times tending to urge said shaft axially away from the second spool, and a second abutment surface extending outwardly from said shaft at an angle canted with respect to its axis of rotation so as to face said shaft's first abutment surface in spaced relationship around its said axis of rotation with respect thereto, the second abutment surface of the second spool thus serving to exert forces against said second abutment surface of said shaft tending to displace said shaft away from the second spool in a direction axially thereof when substantially all of the strip of material has been uncoiled from the second spool causing the termination of rotation of the second spool and inertial forces in said shaft continue to effect rotational movement of said shaft in said first direction displacing its said second abutment surface into engagement with the second abutment surface of the second spool;

motor means energizable by a source of electrical energy for selectively imparting torque forces on said drive assembly to effect the rotation thereof about its axis of rotation in a direction advancing substantially the entire length of the strip of photographic material coiled around the second spool onto and around the first spool thereby imparting a rotation of the second spool about its axis of rotation in the first direction;

means for mounting said shaft for axial displacement between a first position wherein said first abutment surface thereof and the first abutment surface of the second spool are operably disposed for purposes of effecting driving engagement therebetween and a second position wherein said shaft is axially disposed a further distance away from the other side of the second spool, and for yieldably restraining said shaft in its said first position, their force acting between the second abutment surface of the second spool and said second abutment surface of said shaft when the second spool has ceased rotating and the initiation of said shaft causes said shaft to continue to rotate in said first direction being effective to displace said shaft from its said first position towards its said second position; and means responsive to the displacement of said shaft from its said first position into its said second position for terminating said torque forces thereby minimizing cinching of the fluid treated strip of photographic material coiled around the first spool.

9. Photographic apparatus for use with a film handling system comprising a supply reel and a takeup reel, the reels being operable to wind a film strip, attached at opposite ends thereof to the supply and takeup reels, from the supply reel onto the takeup reel and rewind the film strip from the takeup reel onto the supply reel upon the reels being driven, the film handling system including means for depositing a coating of processing fluid on the film strip during at least its first rewind from the takeup reel to the supply reel, each of the reels being provided with drive interface means comprising an abutment member extending axially from the center of each reel and defining a drive shoulder and a camming surface extending in an axial direction from the associated reel, with the drive shoulder and camming shoulder arranged to converge outwardly from each reel, said apparatus including:

a motor;

a friction clutch;

drive means operable to drive the reels from said motor through said clutch to wind or rewind the film strip, said drive means including a supply reel drive shaft and a takeup reel drive shaft adapted to be selectively driven by said clutch, each of said drive shafts carrying a rotatable driving head including an axially projecting driving surface means adapted to engage said drive shoulders on said interface means to rotate said reels in response to the rotation of said heads; and further wherein said driving heads include cam surface means engagable with the camming shoulder on the associated drive interface means, said drive shaft associated with said takeup reel being mounted for limited axial movement away from said takeup reel and, means for resiliently biasing said takeup reel drive shaft into driving engagement with said takeup reel; said drive means being further arranged so that when said drive shaft associated with said supply reel is driven to rewind the film strip, the resulting rotation of said takeup reel and said takeup reel interface means results in engagement of said takeup reel interface means abutment member with said driving surface means associated with said takeup reel drive shaft, causing rotation of said takeup reel drive shaft during rewind;

whereupon, when all of said film strip is wound upon said supply reel during rewind, said supply spool ceases to rotate due to slippage of said clutch, and further, upon cessation of rotation of said supply spool the inertia of said takeup reel drive shaft and its associated driving head is sufficient to cause said shaft and driving head to rotate said camming surface of said driving head into engagement with said camming shoulder of its said associated drive interface with sufficient force to cause said driving head and said takeup reel drive shaft to be cammed axially outward from said takeup reel drive interface;

means for sensing said axial motion of said takeup reel drive shaft and generating a signal in response to sensing of said axial motion; and means for rendering said drive means inoperative to drive said supply reel in response to said signal, thereby minimizing any tensioning forces on the film strip after such advancement thereof has been completed, thereby also minimizing contact between adjacent convolutions of the film strip wound upon said first spool following the deposition of the processing fluid thereon.

10. The apparatus of claim 9 wherein said means for sensing motion and generating a signal comprises a normally open switch which is moved to its closed position, thereby completing an electrical circuit, in response to said axial motion of said takeup reel drive shaft.

11. The apparatus of claim 9 wherein said means for rendering inoperative further includes means for causing ejection of the film handling system from the photographic apparatus.

12. The apparatus of claim 10 wherein said switch is a reed switch having a pair of elongated contact elements, one of which is deflected into contact with the other responsive to said axial motion of said takeup reel drive shaft.

13. The apparatus of claim 12 wherein said biasing means comprieses a cantilever mounted leaf spring member in contact with the outward end of said takeup reel drive shaft and wherein said leaf spring member engages and deflects said contact element of said switch upon deflection of said leaf spring member responsive to said axial motion of said takeup reel drive shaft.

14. Apparatus for use with a photographic film handling cassette of the type including a first rotatably mounted spool, a second rotatably mounted spool and an elongated strip of photographic film having its opposite ends respectively connected to the first and second spools with a major portion thereof coiled around one of the spools, the cassette being configured for depositing a coating of processing fluid on the film strip as it is advanced from the one spool to the other spool to develop viewable images thereon, said apparatus comprising:

means for receiving and mounting the cassette;

a drive shaft assembly engagable with said first spool;

motor means, including a rotor, for imparting torque forces to said drive shaft assembly when the film strip within the cassette is substantially entirely coiled around the second cassette spool to effect the advancement of substantially the entire length of the film strip from the second cassette spool onto and around the first cassette spool; and means for completely terminating said torque forces on said drive shaft assembly substantially immediately following passage of substantially the entire length of the film strip onto and around the first cassette spool, said terminating means comprising; means structurally cooperating with said second cassette spool for effecting rotation of said cooperating means with said second cassette spool during said transfer of the film strip to said first spool, and also, for undergoing axial outward movement with respect to said first spool as a result of the rotational inertia thereof within one-half revolution thereof following passage of substantially the entire length of the film strip onto said first spool, said terminating means further comprising means responsive to said axial outward movement for effecting said substantially immediate termination of said torque forces to said drive shaft assembly, thereby minimizing any tensioning forces on the film strip after such advancement thereof has been completed, thereby also minimizing contact between adjacent convolutions of the film strip wound upon said first spool following the deposition of the processing fluid thereon.

15. Apparatus for use with a cassette of the type including a first rotatably mounted spool, a second rotatably mounted spool and an elongated strip of material having its opposite ends respectively connected to the first and second spools with a major portion thereof coiled around one of the spools, the cassette being configured for depositing a coating of fluid on the elongated strip as it is advanced from the one spool to the other, said apparatus comprising:

means for receiving and mounting the cassette;

a drive shaft assembly engagable with said first spool;

motor means, including a rotor, for imparting torque forces to said drive shaft assembly when the elongated strip of material within the cassette is substantially entirely coiled around the second cassette spool to effect the advancement of substantially the entire length of the elongated strip of material from the second cassette spool onto and around the first cassette spool; and means for completely terminating said torque forces on said drive shaft assembly substantially immediately following passage of substantially the entire length of the elongated strip of material onto and around the first cassette spool, said terminating means comprising a member in axial engagement with said second cassette spool so as to be rotated therewith during the transfer of the elongated material to said first spool and to be axially displaced therefrom responsive to relative movement therebetween on stoppage of said second spool and continued rotation of said member as a result of the rotational inertia of said member, within one-half revolution of said member following passage of substantially the entire length of the elongated strip of material onto said first spool, said terminating means further comprising means responsive to said axial displacement of said member for effecting said substantially instantaneous termination of said torque forces to said drive shaft assembly, thereby minimizing any tensioning forces on the elongated strip of material after such advancement thereof has been completed, thereby also minimizing contact between adjacent convolutions of the elongated strip wound upon said first spool following the deposition of the processing fluid thereon.

16. The apparatus of claim 14 wherein said drive assembly includes a slip clutch and said motor means is energizable by a source of electrical energy, and said torque force terminating means includes a normally conducting electrical switch electrically coupled between the source of electrical energy and said motor means and said torque force terminating means includes means for rendering said switch non-conducting.

17. The apparatus of claim 15 wherein said drive assembly includes a slip clutch and said motor means is energizable by a source of electrical energy, and said torque force terminating means includes a normally conducting electrical switch electrically coupled between the source of electrical energy and said motor means and said torque force terminating means includes means for rendering said switch non-conducting.

* * * * *